United States Patent
Novak et al.

[19]

[11] Patent Number: 6,086,295
[45] Date of Patent: Jul. 11, 2000

[54] AUTOMATED FLASH REMOVING APPARATUS

[76] Inventors: Norm Novak, 1869 250 NW., Oxford, Iowa 52322; Eric Bailey, 5665 Lower W. Branch Rd. SE., West Branch, Iowa 52358

[21] Appl. No.: 08/884,761

[22] Filed: Jun. 30, 1997

[51] Int. Cl.$^7$ .................................................. B23C 1/08
[52] U.S. Cl. ........................... 409/138; 83/914; 409/140; 409/202; 409/203; 409/212; 451/530
[58] Field of Search .................................... 409/138, 139, 409/140, 183, 190, 191, 199, 202, 203, 212; 83/914; 425/806; 264/161; 228/125; 451/530, 542

[56] References Cited

U.S. PATENT DOCUMENTS

| | | | |
|---|---|---|---|
| 1,838,816 | 12/1931 | Fickett et al. | 409/202 |
| 2,032,362 | 3/1936 | Herman | 451/530 |
| 2,851,830 | 9/1958 | Metzig et al. | 451/530 |
| 3,150,469 | 9/1964 | Berenbak et al. | . |
| 3,418,883 | 12/1968 | Leibow | 409/138 |
| 3,610,098 | 10/1971 | Walker | 409/203 |
| 4,022,106 | 5/1977 | Kile | 409/191 |
| 4,054,081 | 10/1977 | Brown | 409/139 |
| 4,061,077 | 12/1977 | Gladwin | 409/199 |
| 4,151,783 | 5/1979 | Zimmermann | 409/190 |
| 4,614,018 | 9/1986 | Krall | 29/33 J |
| 4,670,964 | 6/1987 | Bleich | 483/22 |
| 4,780,952 | 11/1988 | Babel et al. | 483/25 |
| 4,787,786 | 11/1988 | Freud et al. | . |
| 4,799,836 | 1/1989 | Kurisu et al. | . |
| 4,836,722 | 6/1989 | Kurita | . |
| 4,878,789 | 11/1989 | Grant | 409/190 |
| 4,944,080 | 7/1990 | Blumbach et al. | 409/140 |
| 4,979,283 | 12/1990 | Kurita et al. | 409/140 |
| 4,979,854 | 12/1990 | Kurita et al. | 409/138 |
| 4,995,286 | 2/1991 | Kobayashi et al. | 82/101 |
| 5,052,154 | 10/1991 | Lehmann | 451/530 |
| 5,106,592 | 4/1992 | Dona et al. | 82/123 |
| 5,112,170 | 5/1992 | Sasaki | 409/140 |
| 5,146,670 | 9/1992 | Jones | 409/138 |
| 5,340,247 | 8/1994 | Cuneo et al. | 409/191 |
| 5,403,131 | 4/1995 | Susnjara | . |
| 5,429,460 | 7/1995 | Campian | 409/202 |
| 5,578,099 | 11/1996 | Neff | 51/297 |
| 5,688,084 | 11/1997 | Fritz et al. | 409/183 |
| 5,868,806 | 2/1999 | Nishio et al. | 51/297 |

FOREIGN PATENT DOCUMENTS

| | | | |
|---|---|---|---|
| 3447292 | 6/1986 | Germany | 409/140 |
| 3831082 | 3/1990 | Germany | 409/140 |
| 170283 | 2/1960 | Sweden | 409/138 |

*Primary Examiner*—Daniel W. Howell
*Attorney, Agent, or Firm*—Glenn Johnson

[57] ABSTRACT

This invention is of an automated flash removal apparatus which features counter-rotating trimming wheels which are positioned against the molded flexible urethane part or the molded flexible polyvinyl chloride part. The force of the trimming wheels against the part undergoing the flash removal process is adjustable and is controlled by opposing tension springs. The trimming wheels may by set at any angle to the part so as to enhance the flash removal characteristics. The trimming wheels are guided along the sides of the part by interchangeable guide bars which may be profiled to accommodate parts which present surfaces that are not substantially straight. The trimming wheels utilize a textured pattern which operate to abrade the flash from the part, thereafter polishing the part on the return pass.

26 Claims, 10 Drawing Sheets

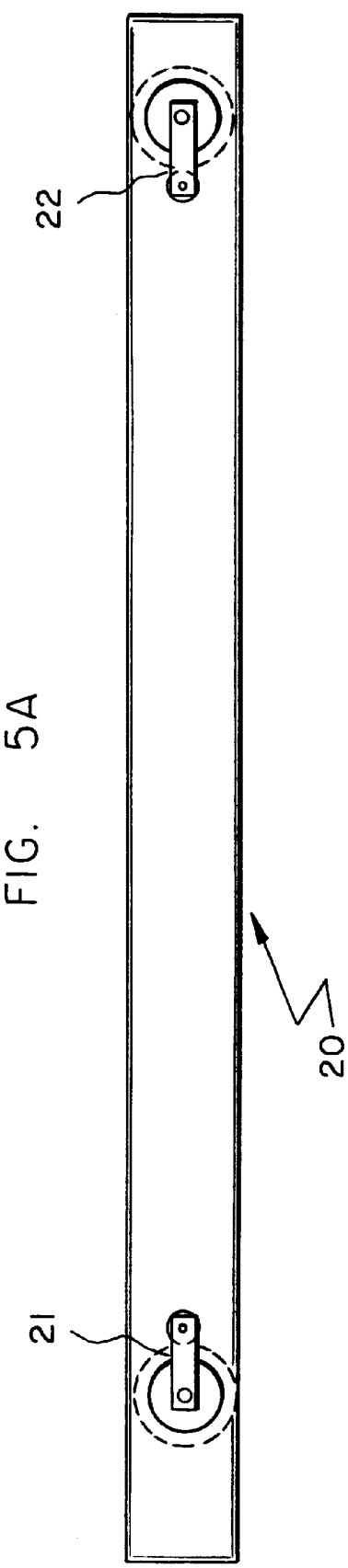
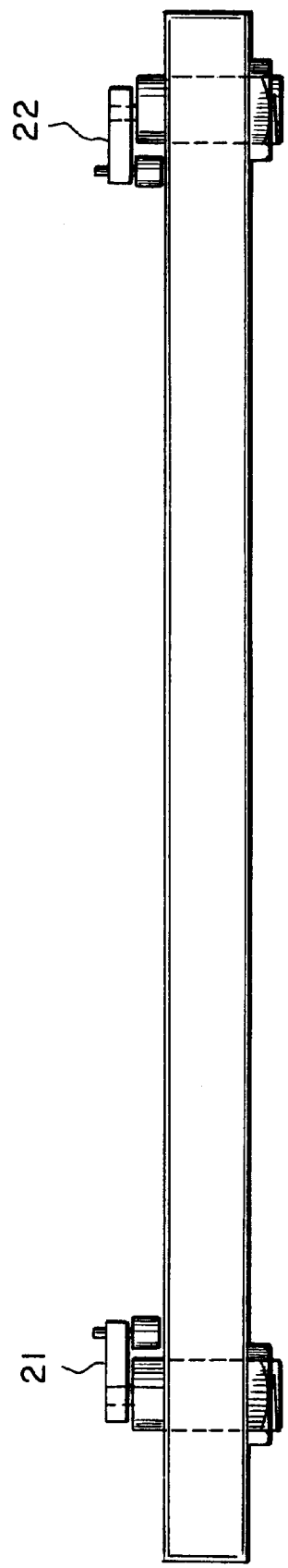
FIG. 5A
FIG. 5B

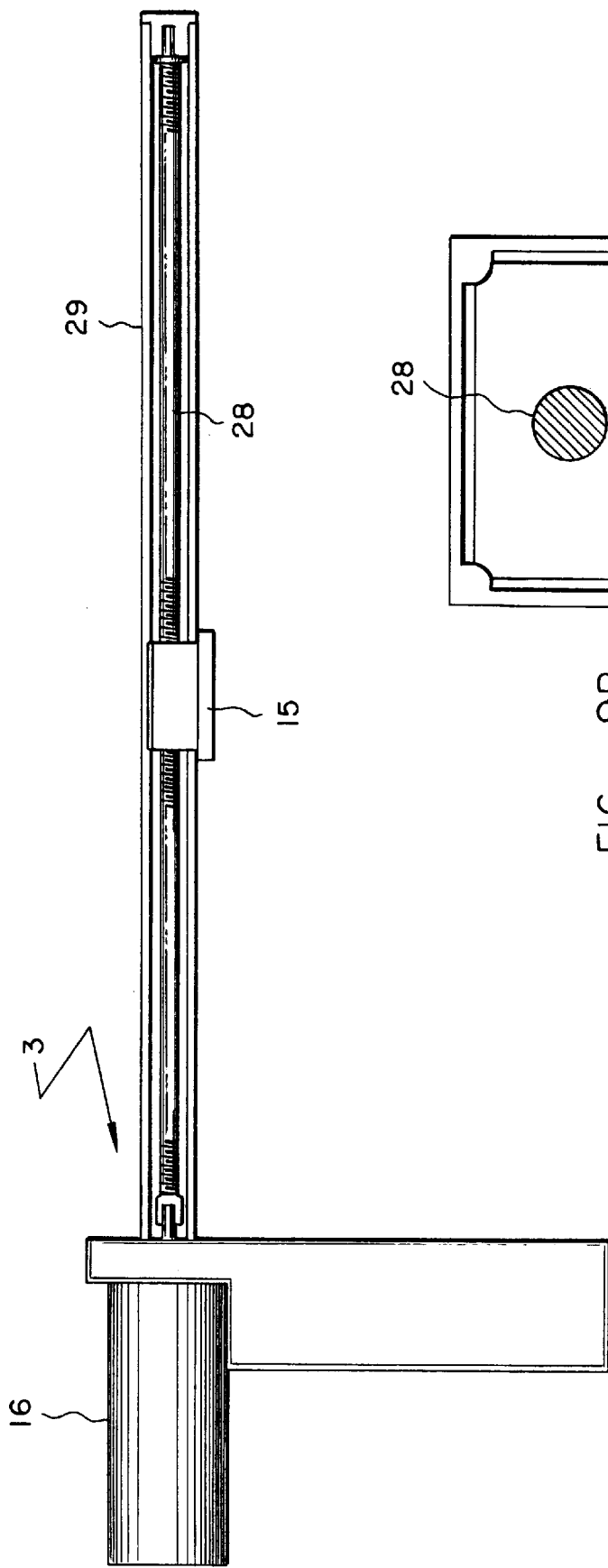
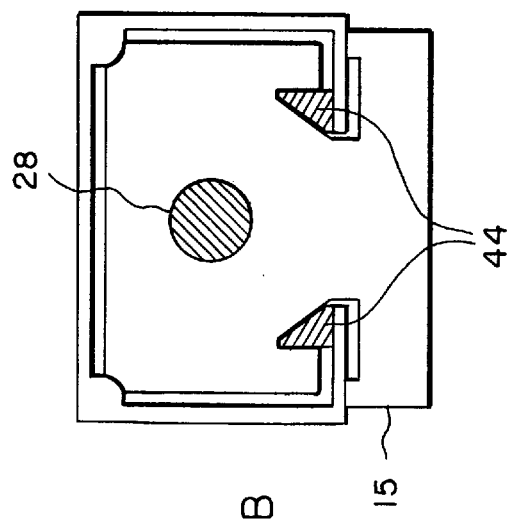

AUTOMATED FLASH REMOVING APPARATUS

BACKGROUND OF THE INVENTION

This invention relates to an automated method and apparatus for removing flash from molded flexible urethane parts and from flexible Polyvinyl Chloride (PVC) parts in an efficient manner and without causing cosmetic damage to the surface of the part.

Many of today's products utilize polyurethane parts that are produced by way of pressure injected molding processes including low pressure mixing, high pressure mixing, and reaction injection molding. These processes can be combined with a process whereby the polyurethane part is painted at the time of molding.

The industry also manufactures many flexible polyvinyl chloride (PVC) parts by an injection molding process or a blow molding process. Flexible PVC parts are also utilized as component parts in many ways, and particularly as interior parts utilized by the automotive industry.

The molds or dies utilized in the pressure injected molded processes are generally comprised of two or more pieces that are clamped or otherwise bound tightly together. As a result of the pressure utilized to inject the liquid polyurethane into these molds, or the design of the molds to allow for the escape of evacuating air from within the mold during the injection process, frequently a thin layer of polyurethane and/or paint is forced past the connecting seams of the pieces comprising the mold. As a result, a thin layer of material called flash adheres to the surface of the finished molded piece and disrupts the symmetry of the finished surface. The flash may be comprised of excess and unwanted polyurethane material which is referred to as flash. Also, flash may be comprised of excess and unwanted paint, which is referred to as paint flash.

Manufacturing companies that purchase polyurethane molded parts from suppliers are becoming ever more demanding as to the dimensional specifications and cosmetic criteria for the finished molded products. As a result, polyurethane molded parts producers are spending ever more time and money in order to meet the increasing demand for quality molded products. A primary area of interest to the purchasers of molded parts is the seam area where the molds fit together. The finished products may not have any flash. Further, molded parts manufacturers must produce products that are seamless, and are without any disruption or discontinuity of the textured surface of the part.

The difficulties faced by polyurethane molded parts manufacturers in meeting these finished product specifications have increased in recent years. Most polyurethane parts are manufactured utilize a process which forms a thick, bubble-free outer surface referred to as the skin. In the industry molded polyurethane parts manufactured by this process are said to use "self-skinning" polyurethane. The primary manufacturing technique employed in the production of self-skinning polyurethane parts utilized freon and was referred to as a freon blown process. In 1994 the federal government banned the freon blown process. An advantage associated with parts manufactured by way of the freon blown process was the formation of a very thick skin on the molded part. With the governmentally mandated changes in the manufacturing process, water blown urethanes are now employed. Polyurethane parts made with the water blown process have a substantially thinner skin. A thinner skin on the polyurethane part magnifies the problems for manufacturers attempting to meet the ever more rigid dimensional and quality requirements as it is much easier to break through or otherwise disrupt the surface continuity of the part during the flash removal process.

In order to meet the requirements of the industry, manufactures have attempted to employ mechanized devices in the removal of flash. Many of these have failed. The primary modes of failure of mechanized flash removal apparatus involve the inability to consistently remove all of the flash material, or the extensive removal of surface material of the part resulting in the a break in the skin or destruction of the texturing or other cosmetic features of the part in the area of the mold seam.

Polyurethane parts manufacturers have also attempted to utilize cryogenic methods to remove unwanted flash with very limited success. The thickness of the flash to be removed from polyurethane molded parts varies, but is generally in the range of $3/1000^{th}$ to $5/1000^{th}$ of an inch. As a result of the mechanized failures and limited successes with the cryogenic removal of this thin layer of flash, many manufactures of polyurethane molded parts have resorted to removing unwanted flash by a hand work process. This process employs the use of abrasives, such as very fine grade sandpaper, and/or knives. The hand work process has meet with limited success. As with the automated processes, the finished product specifications are very rigid, which results in the rejection of a substantial number of polyurethane molded parts as a result of a break or other discontinuity of the skin of the part, or the disruption or cosmetic flawing of the textured surface of the skin. Further, this process is very time consuming and labor intensive. As much as 40% of the cost associated with labor in the manufacture of a polyurethane molded part is consumed by this hand trimming process. Even though this process produces the best through-put of acceptable parts compared to other flash removal methods, there is still a high rate of nonreworkable rejected parts adding to the expense of the manufacturers. The present invention represents a significant improvement to the industry.

SUMMARY OF THE INVENTION

The current invention addresses the two primary problems facing molded polyurethane parts manufacturers—the labor cost associated with the flash removal process and the high nonreworkable reject rate resulting from flash removal procedures.

The current invention is an automated process which utilizes one or more trimming wheels which operate to abrade the flash from the skin of the polyurethane molded part. The trimming wheel is mounted on a pivoting or rotatable housing which allows the trimming wheel to be adjusted and held at a specified angle to the part undergoing the flash removal.

The pressure applied by the trimming wheel to the skin of the polyurethane part is established by hand adjustment of the opposing tension springs which operate to bring the wheel into contact with the part. The opposing tension of the springs allows for the fine adjustment of the trimming wheel so as to remove the unwanted flash while preserving the integrity of the texture and surface of the skin of the part.

The part is mounted in a stationary position on the work platform of the apparatus. The part is retained in place by pin and clamping mechanism. The trimming wheel housing is mounted upon a movable trimmer head which is propelled up and down a track suspended in-line above the part, thereby providing precise movement of the trimming wheels along the surfaces of the polyurethane part undergoing the flash removal process.

The trimming wheels are made of a textured material that provides sufficient frictional characteristics so as to remove the flash when rotating and passed against the side of the polyurethane part undergoing the trimming process. The frictional characteristics are such that the flash is abraded from the skin of the part without damaging the skin or its cosmetic features.

In summary fashion, the operation of the invention involves the loading and securing of the part undergoing the flash removal process. The trimming wheels are activated and are positioned to the part by the movement of the trimmer head which retains the trimming wheels. Upon contact of the activated trimming wheels with the part, spring tensioning controls the amount of pressure exerted by the trimming wheels against the part allowing the invention to remove flash without gouging under the surface or otherwise destroying the cosmetic features of the part.

The invention may be utilized on a variety of flexible PVC molded parts and a variety of polyurethane molded parts, including, but not limited to appliance handles, office furniture arm rests, automotive interior parts, agricultural machinery interior parts, small aircraft interior parts, recreational vehicle parts, and a variety of other components. It is best suited for use on parts having a straight surface or a slightly curved surface upon which the flash is found, but may accommodate compound surfaces by installation of guide bars that follow the contour of the part upon which the trimming operation is being performed.

BRIEF DESCRIPTION OF THE DRAWING

FIG. 5(A) is a top view of the pneumatic clamp assembly.

FIG. 5(B) is a side view of the pneumatic clamp assembly.

FIG. 9A is a detailed side elevational view of the travel bar assembly showing the travel bar 29.

FIG. 9B is a detailed cross-sectional view of the travel bar showing its interior aspect inclusive of the v-rails.

DESCRIPTION OF THE PREFERRED EMBODIMENT OF THE INVENTION

Figure 1:
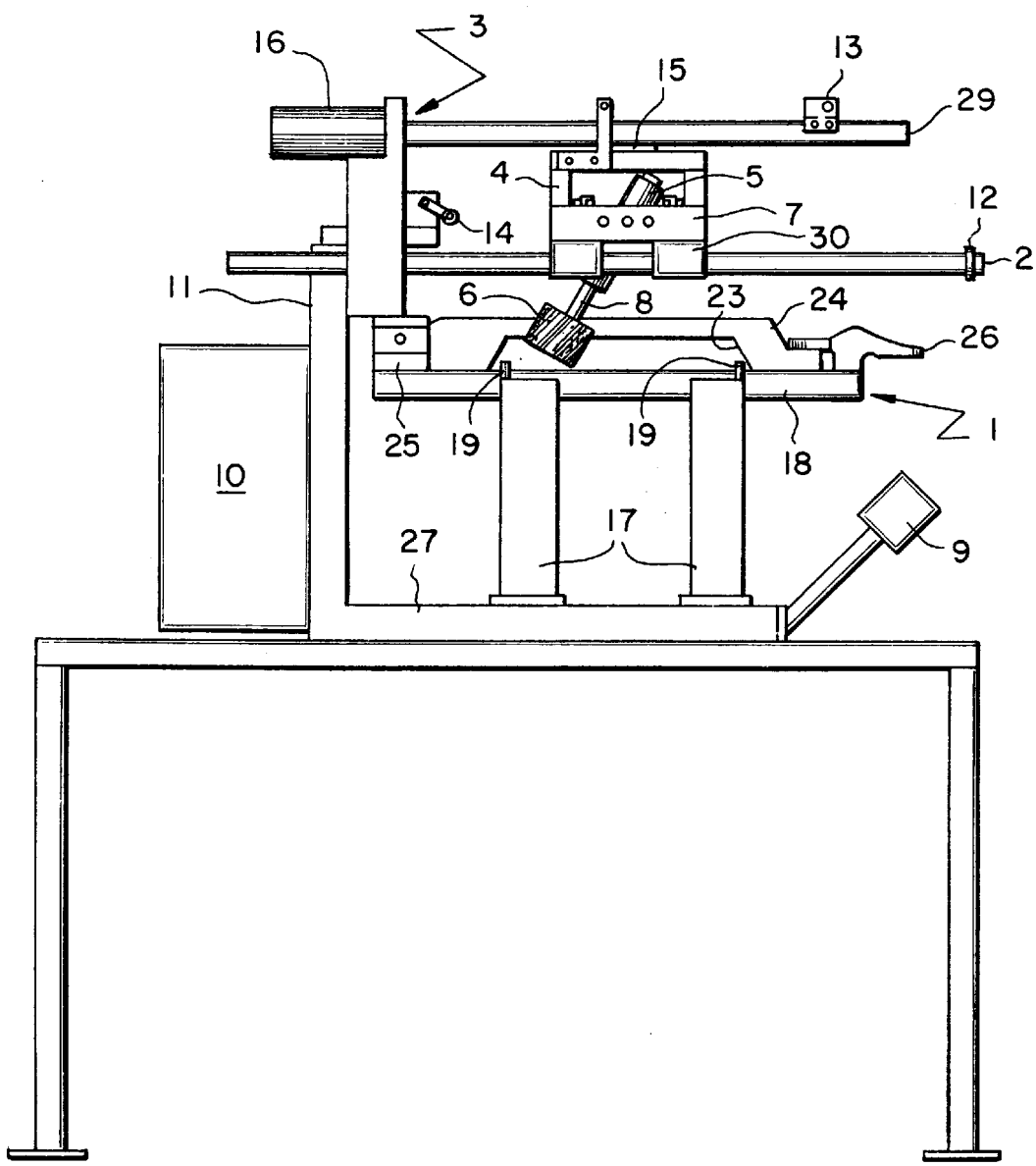
FIG. 1 is a side view of the invention.
Figure 2:
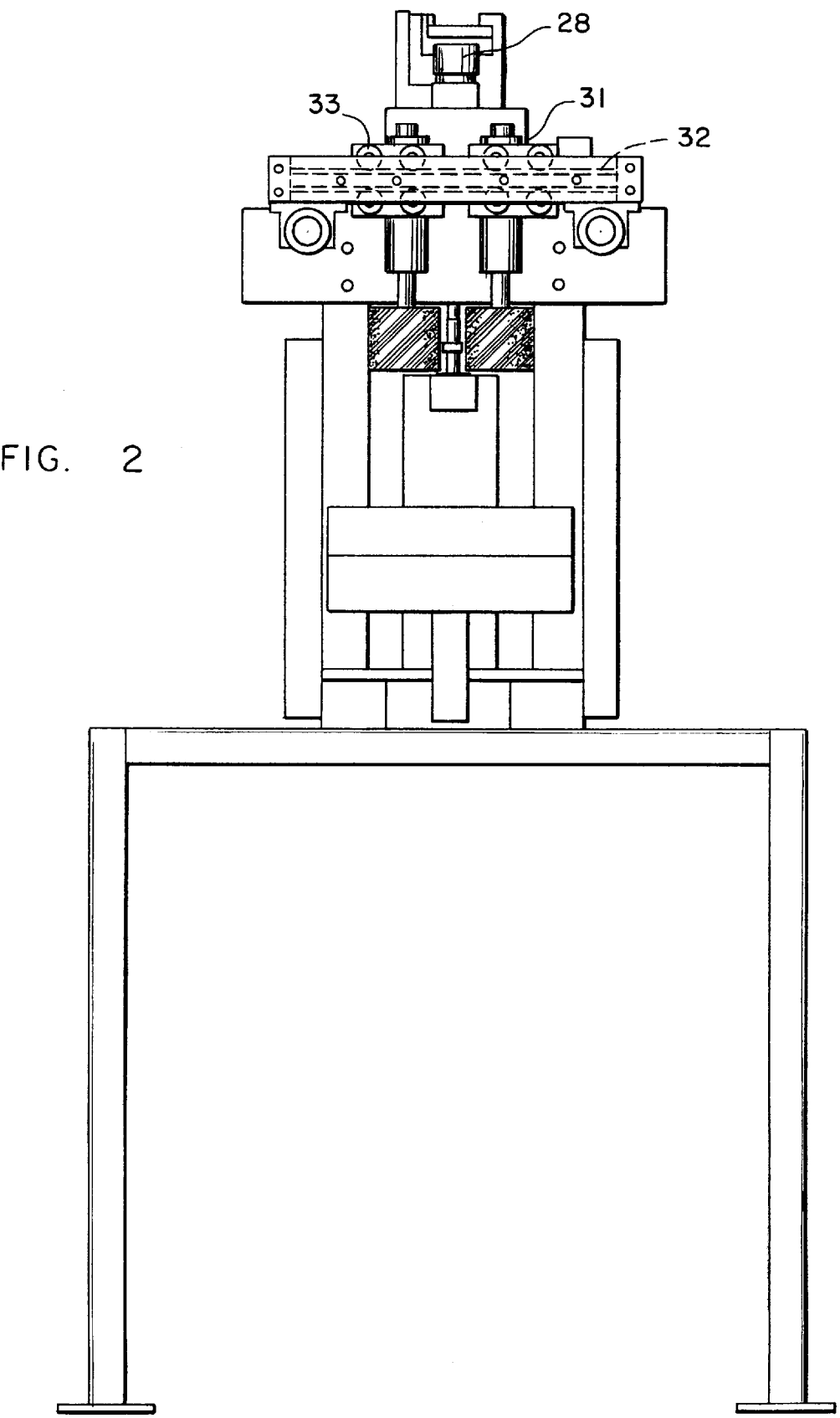
FIG. 2 is a front view of the invention.
Figure 2A:
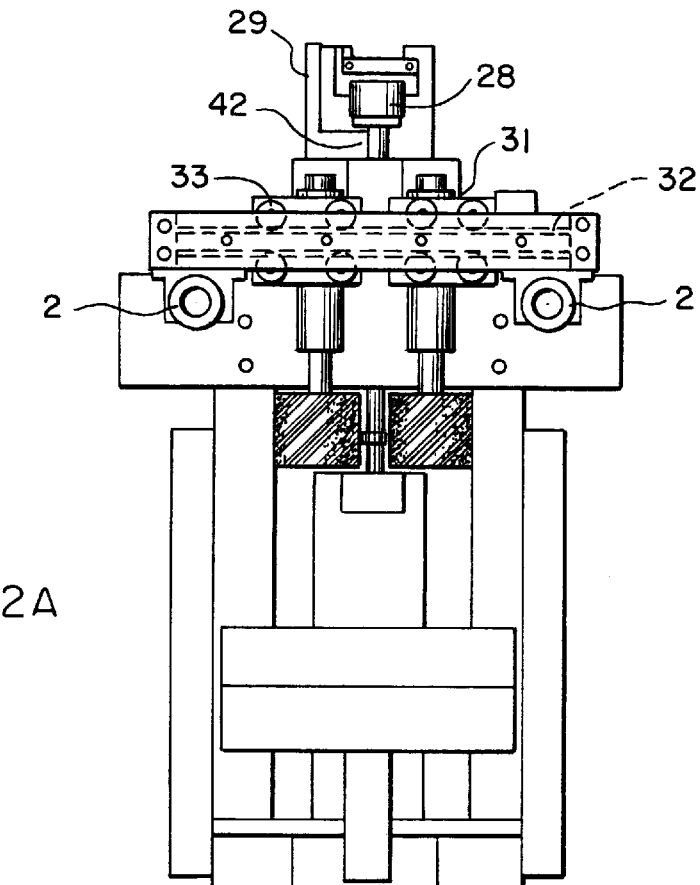
FIG. 2A is a front view showing the pivotal connection of the carriage mount.
Figure 3:
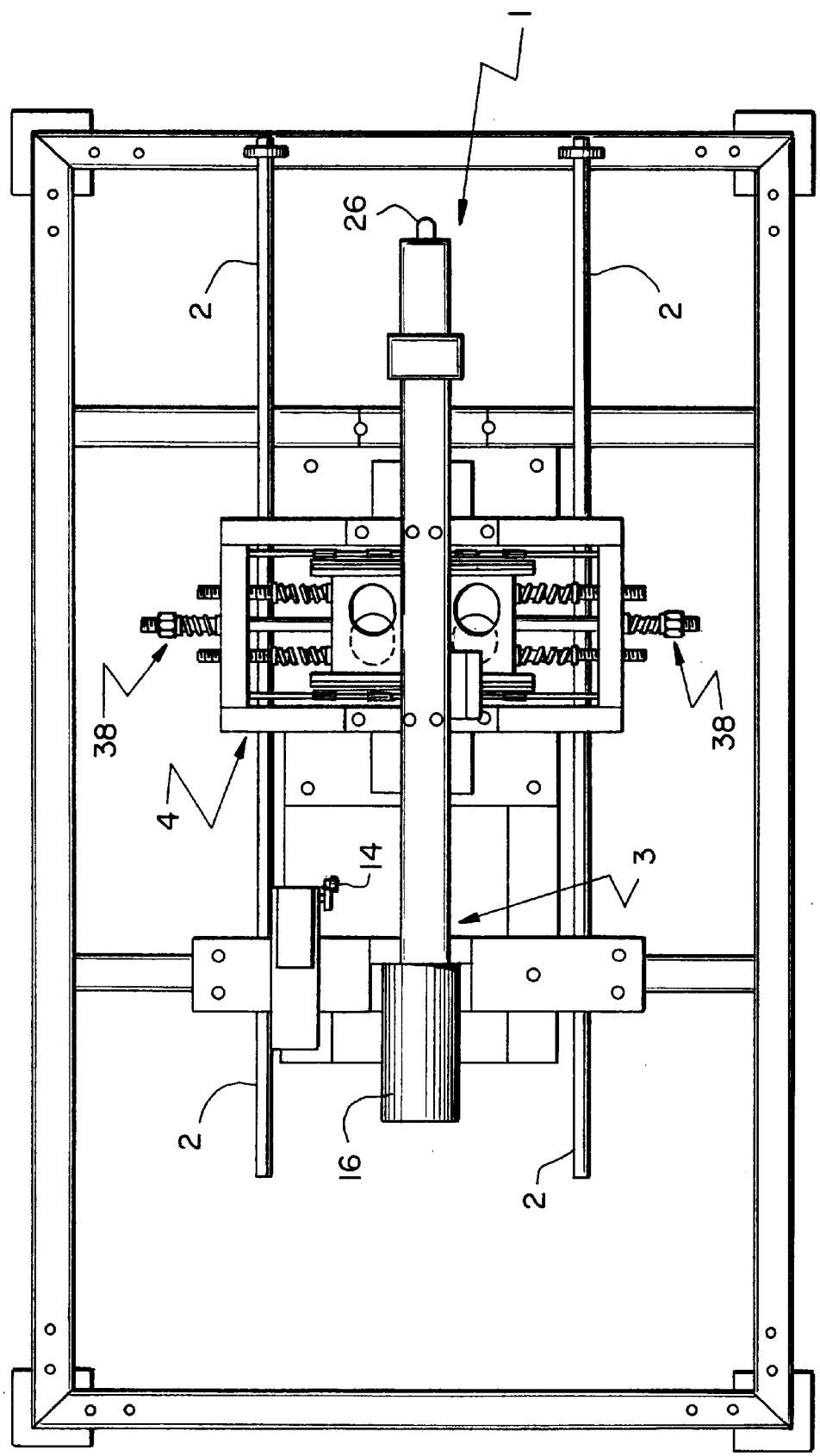
FIG. 3 is a top view of the invention.
Figure 4:
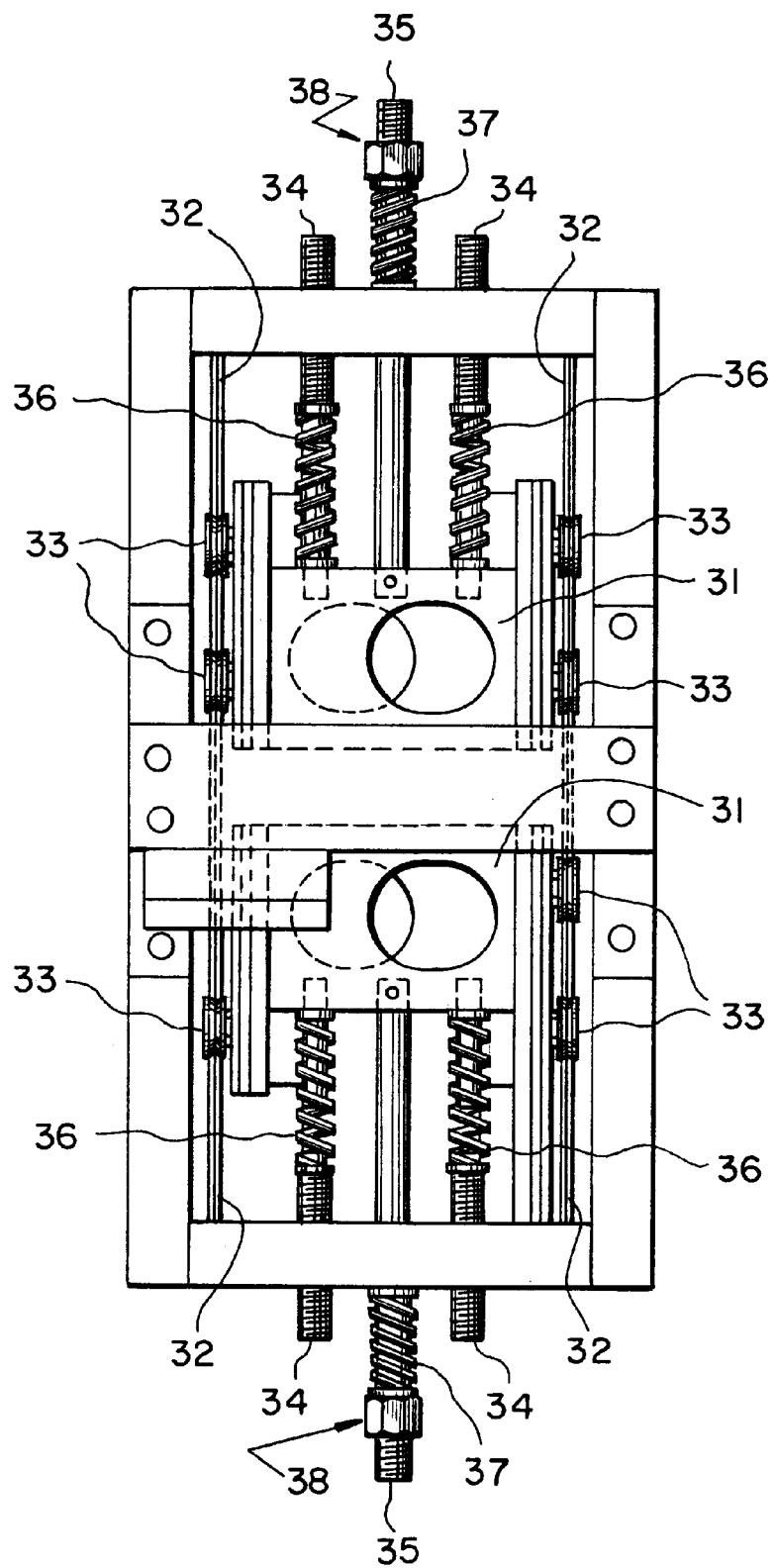
FIG. 4 is a top view of the travel assembly.
Figure 6A:
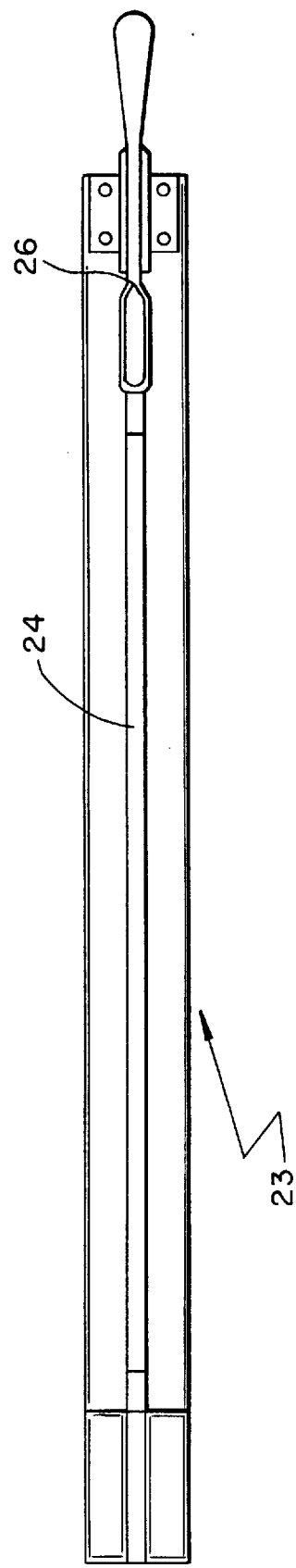
FIG. 6(A) is a top view of the manual clamp assembly.
Figure 6B:
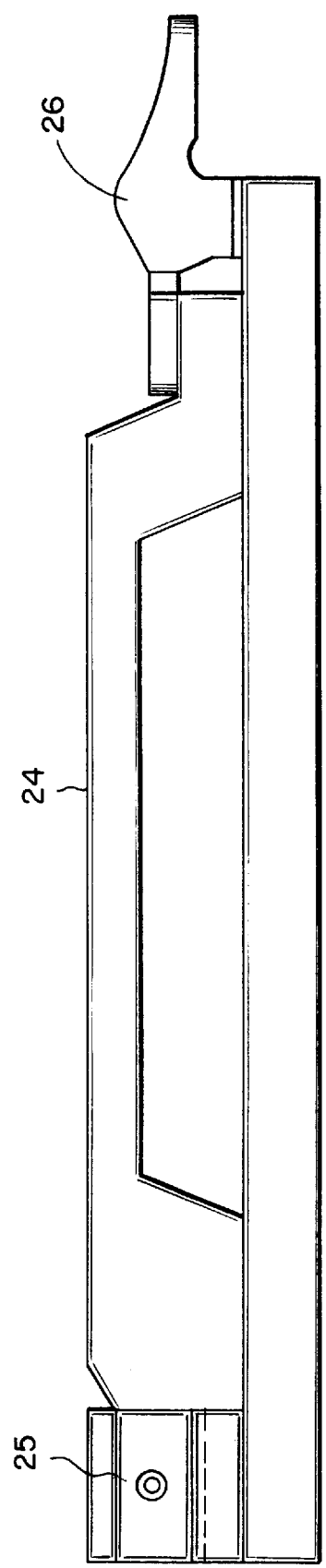
FIG. 6(B) is a side view of the manual clamp assembly.
Figure 7:
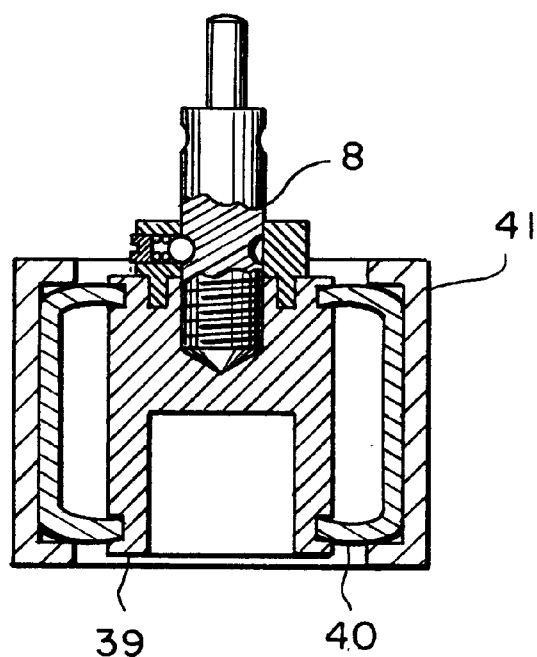
FIG. 7 is a cut-away view of the trimming wheel assembly.

The method and apparatus of the present invention are best suited in the system reflected in FIG. 1 through FIG. 3. This apparatus utilizes dual trimming wheels 6 which operate counter-rotating to each other. The wheel assemblies are aligned opposite each other so as to simultaneously remove the flash from both sides of the part undergoing the trimming process.

A part fixturing assembly 1 rests upon the assembly stand 17. The part fixturing assembly 1 is comprised of the fixturing platform 18 upon which tooling pins 19 are positioned to accommodate the part undergoing the flash removal process. The part is retained in a stationary position upon the tooling pins 19 by a clamp assembly 20 and 23. The preferred embodiment utilizes an automated clamp assembly 20 consisting of front pneumatic clamp 21 and a rear pneumatic clamp 22 which are automatically actuated and moved into position over the surface of the part upon activation of the apparatus. Another embodiment utilizes a manual clamp assembly 23 which consists of a profile bar 24 retained by a rear hinge 25 and held in position over the part by a caddy clamp 26 located at the front of the assembly. To accommodate differing sized parts, differing part fixturing assemblies 1 are utilized which are set-up to the dimensional configuration of the specific part undergoing the flash removal process.

The control panel 10 is located at the rear of the assembly stand base 27 and contains the main power box for the apparatus, proximity sensors, pneumatic regulators, and other electrical controls.

The frame tower 11 is affixed to the assembly stand base 27 and firmly holds in position the travel assembly 3 and the guide bars 2 upon which rides the carriage 4. A control panel 10 is located at the rear of the frame tower 11. An operator station 9 is positioned at the front of the frame tower.

The travel assembly 3 consists of the carriage motor 16 mounted at the rear of the travel assembly 3 which powers the electric screw 28 located within the travel bar 29. At the front of the travel bar 29 is located the front limit switch 13. At the rear of the assembly affixed to the frame is a rear limit switch 14 which halts the rearward travel of the carriage. The travel bar 29 has an open interior and a bottom side that has two parallel travel bar v-rails 44.

The carriage 4 is a metallic frame structure open at its top and containing v-rails 32 upon which rest the two opposing trimmer head assemblies 7. The carriage 4 is affixed at its bottom on each side to two linear bearings 30 which ride upon corresponding parallel guide bars 2. Each guide bar 2 at its front end has a shaft stop 12 and is firmly mounted at its rear to the frame tower 11. The upper portion of the carriage 4 is affixed to the carriage mount 15 which at its top envelopes the electric screw 28 contained within the travel bar 29. For parts that are linear, a rigid carriage mount 15 is utilized in conjunction with straight guide bars 2. For parts that are curved, a pivotal carriage mount 42 is utilized with profiled guide bars 43.

Each trimmer head assembly 7 consists of a motor block 31 to which are affixed v-groove wheels 33 that ride upon the corresponding v-rails 32 located within the carriage 4. Threadably retained within the outside edge of each motor block 31 are two exterior studs 34 and one center stud 35. Each exterior stud 34 protrudes from the motor block 31 a short distance and functions as a stabilizer for an inbound tensioning spring 36 which extends from the outside edge of the motor block to the interior of the side wall of the carriage 4. The center stud 35 extends through a hole bored in the side wall of the carriage 4. An outboard tensioning spring 37 is slideably placed over the portion of the center stud 35 which protrudes from the side wall of the carriage 4 and is retained in place by an outboard tensioning nut assembly 38.

A center bore hole is located within each motor block 31 into which the top portion of the trim motor 5 is inserted. In its preferred embodiment, the trim motor is operated pneumatically which affords the use of a smaller sized motor which more quickly reaches the desired rpm level when actuated. The trim motor 5 is retained in place by operation of a set screw. A collet is located at the bottom of each trim motor 5 into which is inserted the top end of the arbor 8. The bottom end of the arbor 8 retains the trimming wheel 6 which is comprised of an interior metallic wheel 39, an interior tire tube 40, and an exterior trim tread band 41. In its preferred embodiment the arbor 8 is a quick attach arbor which allows for easy and efficient replacement of the trimming wheel 6.

The operation of the invention in its preferred embodiment is described as follows. With the part mounted and secured in place on the part fixturing assembly 1, the revolving trimming wheels 6 are actuated in a counter-rotating action turning against the direction of travel of the carriage. The trimming wheels are oriented at an angle of 60°±5° for parts with a predominately straight surface undergoing the trimming operation, but are oriented at an angle of 90°±5° for parts with significantly curved surface undergoing the trimming operation.

Figure 8:
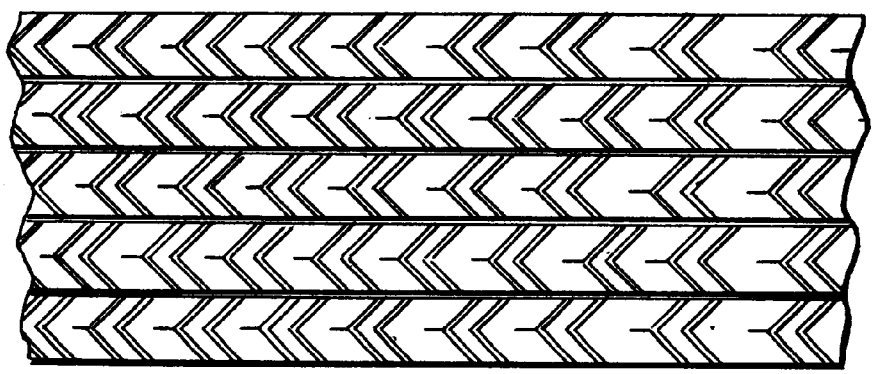
FIG. 8 is a view of the tread pattern.
Figure 10:
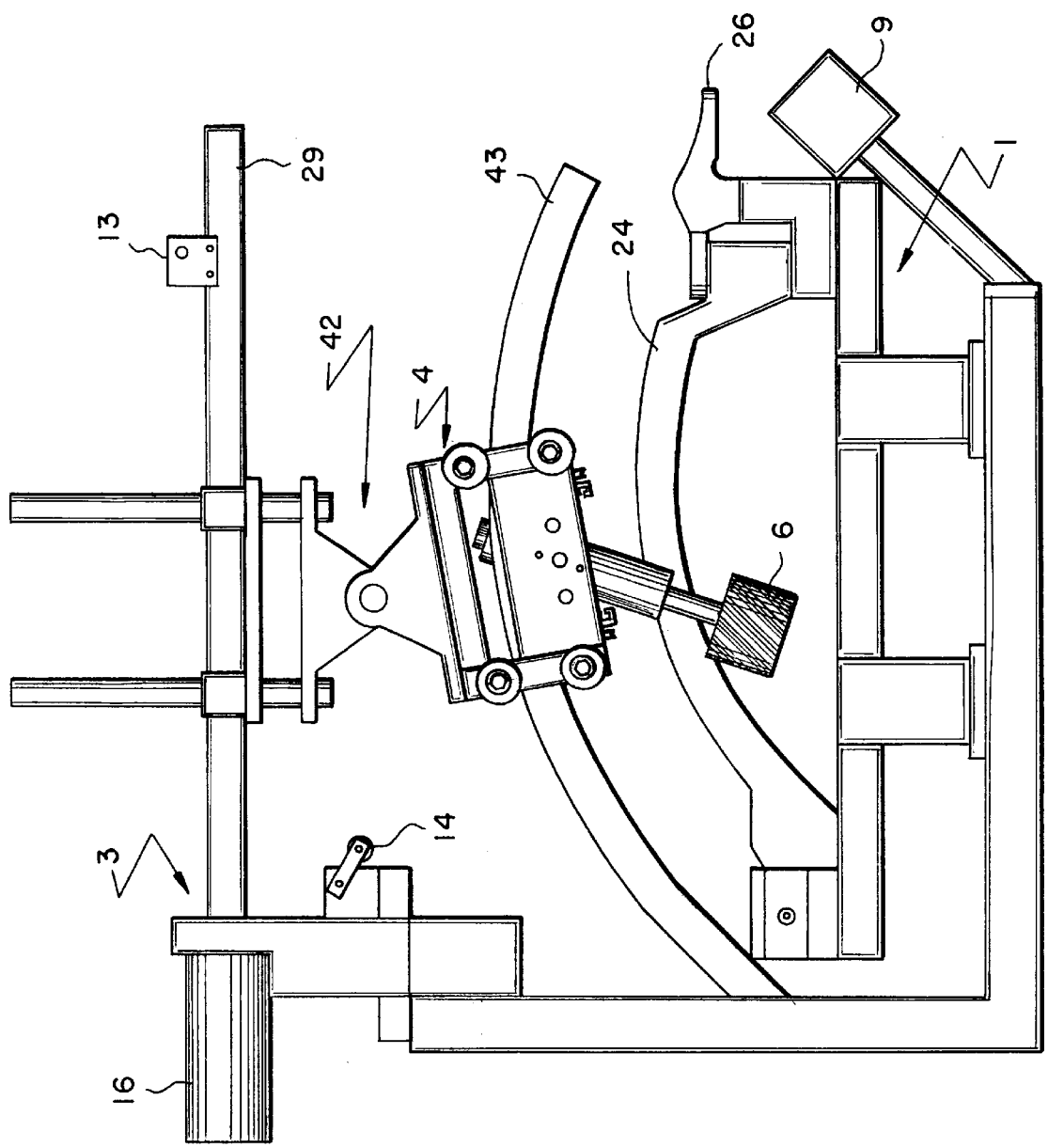
FIG. 10 is a side elevational view of the invention showing the use of a profiled guide bar 43 and a pivotal carriage mount 42.

The preferred operation further utilizes the directional pattern of the tread on the exterior trim tread band 41 which has been determined to abrasively remove unwanted flash on the first pass of the trimming wheels 6 over the part. The optimal tread pattern has been determined to consist of an intermittent chevron pattern, FIG. 8. On the first pass over the part, the interior v of the chevrons is rotated into the part against the direction of travel of the trimming wheels. On the return pass of the trimming wheels over the part, the trimming wheels continue to counter-rotate in the same direction which on the return pass is with the direction of travel of the carriage 4. This operates to reduce the frictional effect on the return pass thereby buffing the surface of the part to a finished state.

Operation of the trim motors 5 at 3200 RPM has been found in most instances to provide optimal results, but a range of 2700 RPMs to 3200 RPMs has been used to achieve optimal results dependent upon the nature of the part being worked upon and the wear on the exterior trim tread bands 41.

The carriage motor 16 precisely controls the travel of the carriage, thus precisely controlling the travel of the trimming wheels 6 across the part undergoing the trimming operation. This is accomplished by rotation of the electric screw 28 around which is positioned the carriage mount 15. Best results have been shown by regulating the travel of the carriage at the rate of 200 mm per second, +200/−50 mm per second dependent upon the nature of the part being trimmed. Use of an electric motor for the carriage motor 16 has produced the preferred results. A hydraulic motor may also be utilized as the carriage motor 16.

To ensure that the part undergoing flash removal is adequately processed, but not damaged by the operation, the force applied by the trimming wheels to the part as they pass over it is regulated by the opposing spring tensioning force created by the inbound tensioning springs 36 and the outboard tensioning springs 37. In the resting position, the outboard tensioning springs 37 are retained in a compressive mode by the opposing action of the inbound tensioning springs 36. As a part contacts the trimming wheels to begin the trimming process, the wheels separate around the part which separation is aided by the operation of the outboard tensioning spring 37 which counteracts the inward forces applied by the operation of the inbound tensioning springs 36. This is accomplished by the outboard tensioning springs pushing outwardly upon the outboard tensioning nut assembly 38 which applies an outward pulling force to the motor blocks. The effect of this outward force is to dampen the countervailing force which operates to push the trimming wheels against the surface of the part undergoing the trimming operation.

The configuration of the parts undergoing the trimming operation varies greatly. The opposing spring tensioning forces operate to allow the trimming wheels 6 to float on the surface of the part which can successfully accommodate surface variations upwardly to 0.120 of an inch. Further, to accommodate the changes of shore "A" or the configuration of the differing molded parts which undergo flash trimming operations, the frictional forces applied by the trimming wheels against the surface of the part may be varied by adjustment of the outboard tensioning nut assembly 38 and/or the modification of the springs comprising the inbound tensioning springs 36 and outboard tensioning springs 37.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included within the scope of the following claims.

We claim:

1. A flash removal apparatus for use in the automated removal of flash from molded flexible urethane parts and molded flexible polyvinyl chloride parts comprising:

A carriage assembly comprising a control means for varying the pressure exerted upon flexible parts from which flash is being removed;

At least one trimmer head assembly which operates to remove flash from parts;

A guidance assembly for controllably directing the movement of the carriage assembly during the process of flash removal from parts;

A travel assembly for moving the carriage assembly during the process of flash removal from parts;

A part fixturing assembly for retaining a part during the flash removal process;

A first power means to power the trimmer head assembly during the process of flash removal from parts;

a second power means to power the travel assembly; and

A frame assembly comprising the frame tower, assembly stand and assembly stand base which retain the carriage assembly, guidance assembly, part fixturing assembly, travel assembly, and power assembly.

2. The apparatus of claim 1 wherein the tower assembly is mounted upon a base.

3. The apparatus of claim 1 wherein the trimmer head assembly is compromised of the following:

A motor block;

A trim motor having a top and bottom and functioning to power said trimmer head assembly;

An axial member extending downwardly from the bottom of said trim motor;

A trim wheel appended to the axial member at its end opposite the end extending from the bottom of said trim motor.

4. The apparatus of claim 3 wherein said trimmer head assembly is adjustable to position the trim wheel at differing angles to the part undergoing the flash removal process.

5. The apparatus of claim 3 wherein said trim wheel has a tread pattern extending from the surface which operates to abrasively remove flash from the part undergoing the flash removal process.

6. The apparatus of claim 5 wherein the tread pattern extending from the surface of said trim wheel is comprised of an intermittent chevron pattern.

7. The apparatus of claim 1 wherein the carriage assembly is comprised of the following:

A carriage having an upper and lower portion with said upper portion having four sides with interior and exterior walls creating an open interior within the upper portion of said carriage;

A carriage mount affixed to the upper portion of said carriage;

A plurality of v-rails located within the open interior of the upper portion of the carriage and positioned parallel to each other and opposite the direction of travel of the carriage;

A least one motor block; and

Wherein the control means for varying the pressure exerted upon flexible parts comprises:

At least one interior tension spring;

At least one exterior stud having a first end and a second end, the first end affixed to the wall of the upper portion of the carriage, the interior tension spring inserted over and retained by said exterior stud, and the second end of said exterior stud affixed to the motor block;

At least one tension adjustment retention connector;

At least one center stud having a first end and a second end, said first end extending through and protruding outwardly from the side wall of the upper portion of the carriage to which is affixed said tension adjustment retention connector, and the second end affixed to the motor block; and At least one outboard tension spring inserted over said first end of said center stud and positioned between the tension adjustment retention connector affixed to said first end of said center stud and the exterior wall of said upper carriage.

8. The apparatus of claim 1 wherein two trimmer head assemblies are utilized providing two trim wheels for the removal of flash.

9. The apparatus of claim 8 wherein the trim wheels are actuated in a counter-rotational direction to one another.

10. The apparatus of claim 1 wherein the guidance assembly is comprised of the following:

At least one guide bar having a forward end and a rearward end, said rearward end affixed to said tower assembly;

A shaft stop positioned at the forward end of said guide bar;

A linear bearing affixed to the lower portion of said carriage and resting about said guide bar.

11. The apparatus of claim 10 wherein two guide bars are positioned in parallel to one another.

12. The apparatus of claim 10 wherein said guide bar is straight.

13. The apparatus of claim 10 wherein the guide bar is profiled to conform to the configuration of the part undergoing said flash removal process.

14. The apparatus of claim 1 wherein:

the carriage assembly has a carriage and a carriage mount affixed to said carriage;

and further wherein the travel assembly is comprised of the following:

An electric carriage motor to power said travel assembly;

A travel bar having a top side, an open interior, and a bottom side, said bottom side forming two parallel v-rails extending upwardly into said open interior with an open gap formed between said parallel v-rails to accommodate the carriage mount;

An electric screw over which is appended said carriage mount;

A front limit switch; and

A rear limit switch.

15. The apparatus of claim 14 wherein the carriage motor is pneumatic.

16. The apparatus of claim 14 wherein the carriage motor is hydraulic.

17. The apparatus of claim 14 wherein a pivotal carriage mount is utilized so as to facilitate the controlled movement of the carriage along at least one profiled guide bar.

18. The apparatus of claim 1 wherein the part fixturing assembly is positioned upon an assembly stand and is comprised of the following:

A fixturing platform;

A plurality of tooling pins affixed to said fixturing platform to accommodate the part undergoing the flash removal process;

A plurality of clamps positioned so as to retain the part upon said tooling pins.

19. The apparatus of claim 18 wherein the clamps are electrically actuated and positioned over the tooling pins.

20. The apparatus of claim 18 wherein the clamps are pneumatically actuated and positioned over the tooling pins.

21. A flash removal apparatus for use in the automated removal of flash from molded flexible urethane parts and molded flexible polyvinyl chloride parts comprising:

A carriage assembly;

At least one trimmer head assembly which operates to remove flash from parts;

A guidance assembly for controllably directing the movement of the carriage assembly during the process of flash removal from parts;

A travel assembly for moving the carriage assembly during the process of flash removal from parts;

A part fixturing assembly for retaining a part during the flash removal process;

A first power means to power the trimmer head assembly during the process of flash removal from parts;

A second power means to power the travel assembly;

A frame assembly comprising the frame tower, assembly stand and assembly stand base which retain the carriage assembly, guidance assembly, part fixturing assembly, travel assembly, and power assembly;

wherein the trimmer head assembly is compromised of the following:

A motor block;

A trim motor having a top and bottom and functioning to power said trimmer head assembly;

An axial member extending downwardly from the bottom of said trim motor;

wherein said trim wheel has a tread pattern extending from the surface which operates to abrasively remove flash from the part undergoing the flash removal process; and wherein the tread pattern extending from the surface of said trim wheel is comprised of an intermittent chevron pattern.

22. A flash removal apparatus for use in the automated removal of flash from molded flexible urethane parts and molded flexible polyvinyl chloride parts comprising:

A carriage assembly;

At least one trimmer head assembly which operates to remove flash from parts;

A guidance assembly for controllably directing the movement of the carriage assembly during the process of flash removal from parts;

A travel assembly for moving the carriage assembly during the process of flash removal from parts;

A part fixturing assembly for retaining a part during the flash removal process;

A first power means to power the trimmer head assembly during the process of flash removal from parts;

A second power means to power the travel assembly;

A frame assembly comprising the frame tower, assembly stand and assembly stand base which retain the carriage assembly, guidance assembly, part fixturing assembly, travel assembly, and power assembly;

Wherein the carriage assembly is comprised of the following:

A carriage having an upper and lower portion with said upper portion having four sides with interior and exterior walls creating an open interior within the upper portion of said carriage;

A carriage mount affixed to the upper portion of said carriage;

A plurality of V-rails located within the open interior of the upper portion of the carriage and positioned parallel to each other and opposite the direction of travel of the carriage;

At least one interior tension spring;

At least one exterior stud having a first end and a second end, the first end affixed to the wall of the upper portion of the carriage, the interior tension spring inserted over and retained by said exterior stud, and the second end of said exterior stud affixed to the motor block;

At least one tension adjustment retention connector;

At least one center stud having a first end and a second end, said first end extending through and protruding outwardly from the side wall of the upper portion of the carriage to which is affixed said tension adjustment retention connector, and the second end affixed to the motor block; and At least one outboard tension spring inserted over said the first end of said center stud and positioned between the tension adjustment retention connector affixed to said first end of said center stud and the exterior wall of said upper carriage.

23. A flash removal apparatus for use in the automated removal of flash from molded flexible urethane parts and molded flexible polyvinyl chloride parts comprising:

A carriage assembly;

At least one trimmer head assembly which operates to remove flash from parts;

A guidance assembly for controllably directing the movement of the carriage assembly during the process of flash removal from parts;

A travel assembly for moving the carriage assembly during the process of flash removal from parts;

A part fixturing assembly for retaining a part during the flash removal process;

A first power means to power the trimmer head assembly during the process of flash removal from parts;

A second power means to power the travel assembly;

A frame assembly comprising the frame tower, assembly stand and assembly stand base which retain the carriage assembly, guidance assembly, part fixturing assembly, travel assembly, and power assembly;

wherein the carriage assembly has a carriage and a carriage mount affixed to said carriage, and wherein the travel assembly is comprised of the following:

An electric carriage motor to power said travel assembly;

A travel bar having a top side, an open interior, and a bottom side, said bottom side forming two parallel v-rails extending upwardly into said open interior with an open gap formed between said parallel v-rails to accommodate the carriage mount;

An electric screw over which is appended said carriage mount;

A front limit switch; and

A rear limit switch.

24. The apparatus of claim 23 wherein the carriage motor is pneumatic.

25. The apparatus of claim 23 wherein the carriage motor is hydraulic.

26. The apparatus of claim 23 wherein a pivotal carriage mount is utilized so as to facilitate the controlled movement of the carriage along at least one profiled guide bar.

* * * * *